(12) United States Patent
Atance Orden et al.

(10) Patent No.: US 8,551,592 B2
(45) Date of Patent: Oct. 8, 2013

(54) TWO-LAYERED PREFORM OBTAINED BY INJECTION OVERMOLDING

(75) Inventors: Angel Atance Orden, Montcada I Reixac (ES); Alain Viron, Desmont (FR)

(73) Assignee: Molmasa Aplicaciones Tecnicas, S.L., Montcada I Reixac, Barcelona (ES)

( * ) Notice: Subject to any disclaimer, the term of this patent is extended or adjusted under 35 U.S.C. 154(b) by 0 days.

(21) Appl. No.: 13/606,155

(22) Filed: Sep. 7, 2012

(65) Prior Publication Data

US 2012/0328814 A1    Dec. 27, 2012

Related U.S. Application Data

(60) Division of application No. 12/575,711, filed on Oct. 8, 2009, now abandoned, which is a continuation-in-part of application No. PCT/ES2008/000226, filed on Apr. 11, 2008.

(30) Foreign Application Priority Data

Apr. 11, 2007   (WO) ................. PCT/ES2007/000202

(51) Int. Cl.
*B29D 22/00* (2006.01)
(52) U.S. Cl.
USPC ....................... 428/36.91; 428/35.7
(58) Field of Classification Search
USPC ............................ 428/35.7, 36.91
See application file for complete search history.

(56) References Cited

U.S. PATENT DOCUMENTS

| 3,301,928 | A |   | 1/1967  | Plymale |
| 4,086,315 | A |   | 4/1978  | Piotrowski |
| 4,935,184 | A |   | 6/1990  | Sorensen |
| 7,332,204 | B2 | * | 2/2008  | Hutchinson et al. ....... 428/36.91 |
| 7,531,226 | B2 | * | 5/2009  | Lee et al. .................. 428/36.91 |
| 7,807,270 | B2 | * | 10/2010 | Share et al. ............... 428/474.4 |
| 8,309,191 | B2 | * | 11/2012 | Wang et al. ................ 428/36.7 |
| 8,389,085 | B2 | * | 3/2013  | Yanagimachi ............. 428/35.7 |
| 2002/0110654 | A1 |   | 8/2002  | Cook et al. |
| 2012/0328814 | A1 | * | 12/2012 | Atance Orden et al. ... 428/36.91 |

FOREIGN PATENT DOCUMENTS

| EP | 1 681 239 A1     | 7/2006 |
| FR | 2 898 293        | 9/2007 |
| WO | WO 89/07219      | 8/1989 |
| WO | WO 95/00325      | 1/1995 |
| WO | WO 2007/090904 A1 | 8/2007 |

* cited by examiner

*Primary Examiner* — N. Edwards
(74) *Attorney, Agent, or Firm* — RatnerPrestia

(57) ABSTRACT

The two-layered preform includes a tubular body having a mouth providing a neck at a first end thereof and a closed bottom at an opposite second end. At least part of the tubular body is formed by a first layer (P1) made of a primary molding material and a second layer (P2) made of an overmolding material. The first layer (P1) is an inner layer made of a primary molding material providing a barrier effect against light by absorption, and the second layer (P2) is an outer layer made of an overmolding material providing a barrier effect against light by reflection. The neck is formed with the overmolding material of the second layer (P2) not coated by the primary molding material of the first layer (P2).

14 Claims, 7 Drawing Sheets

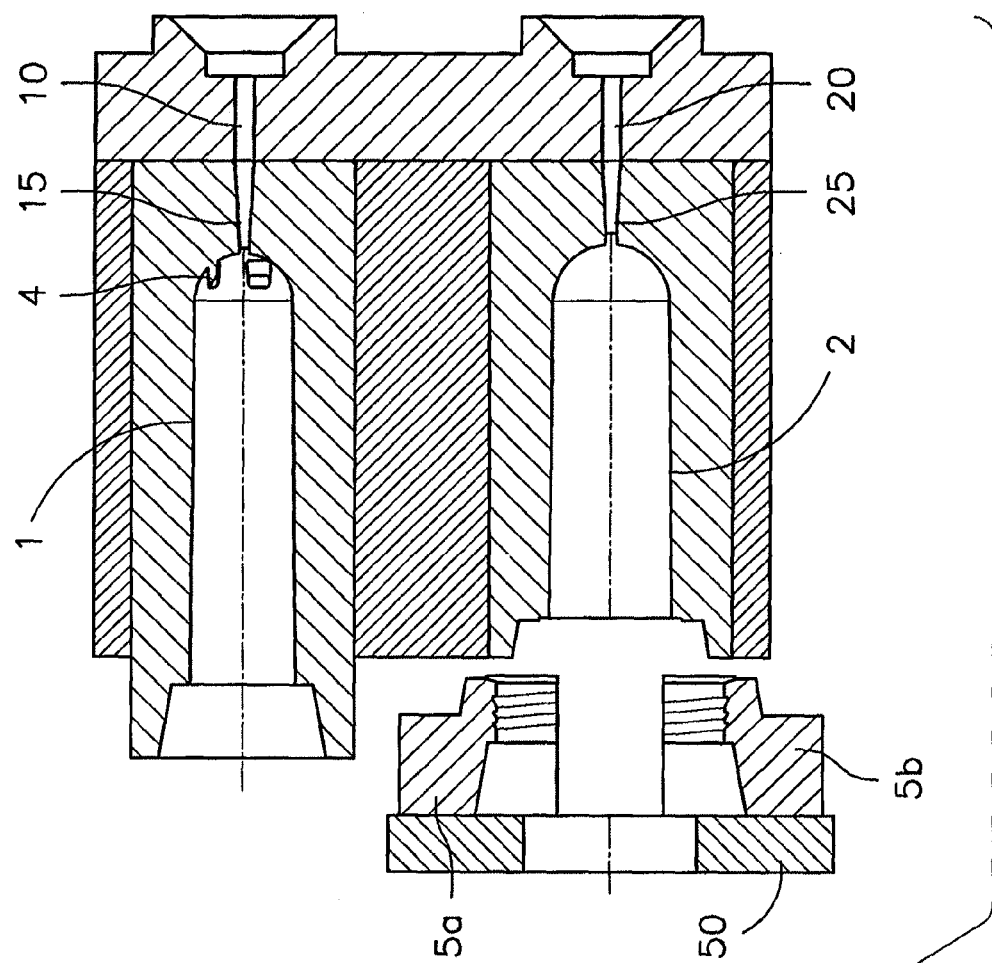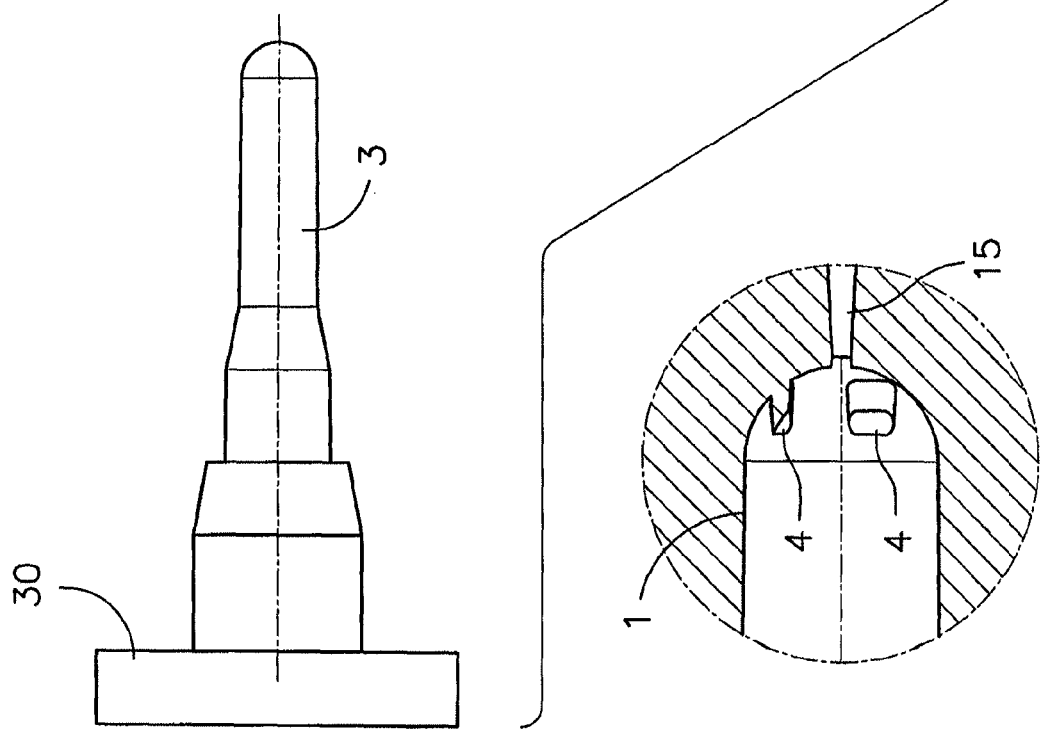
Fig. 1
Fig. 1A

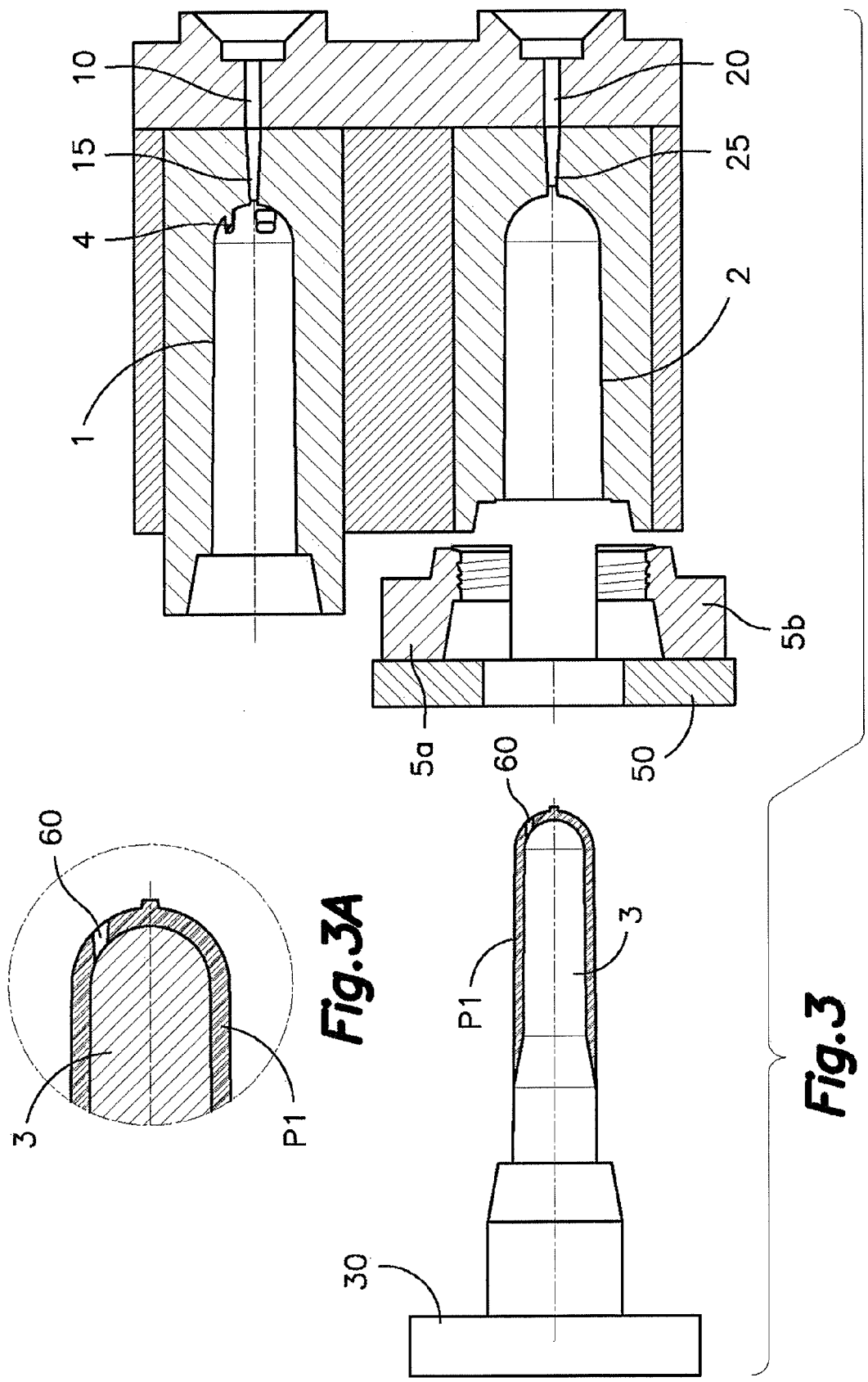

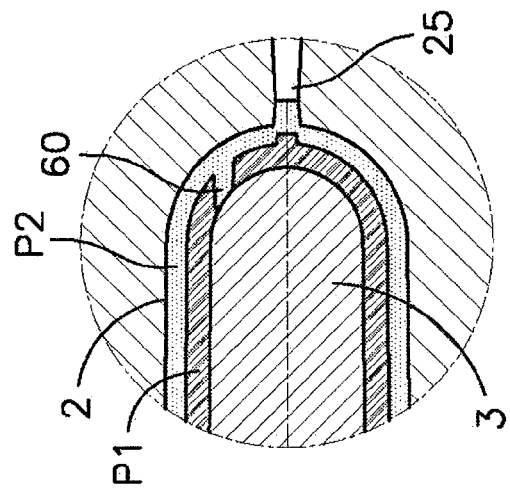
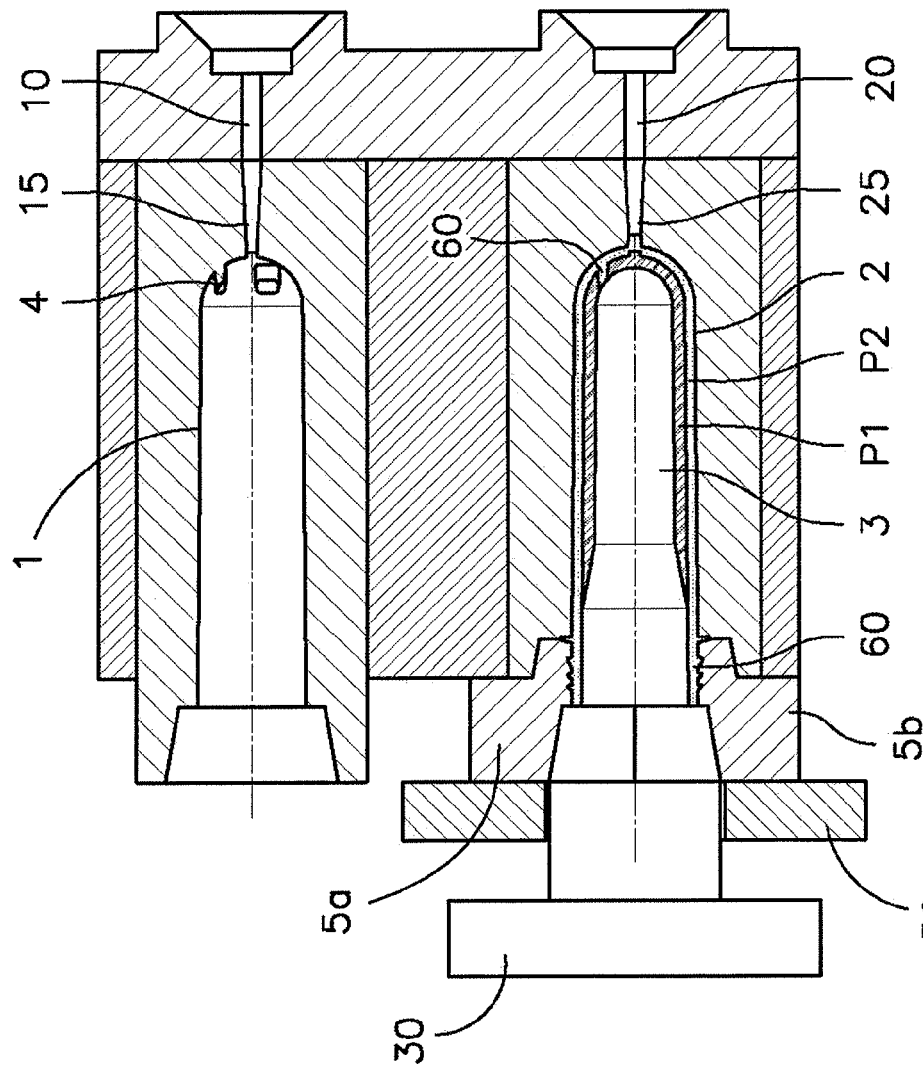

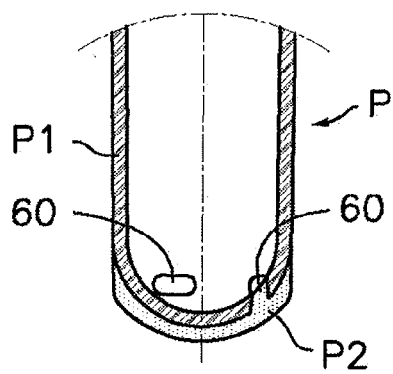
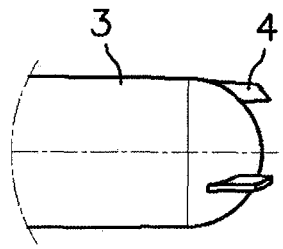
Fig. 11
Fig. 12A
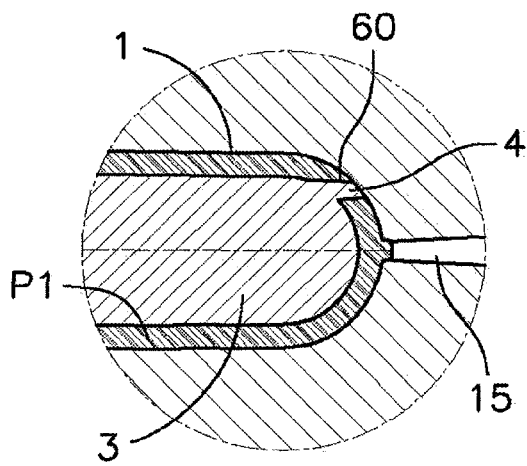
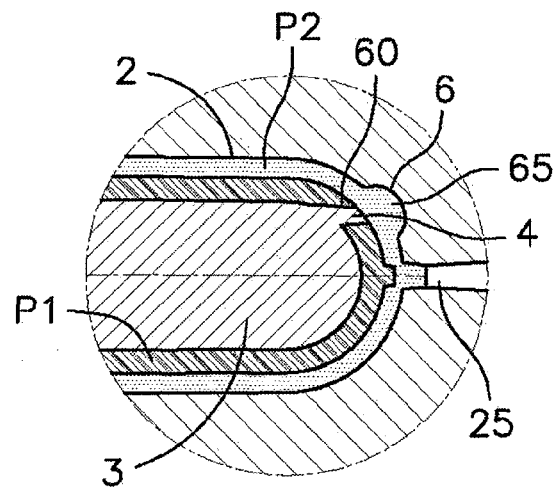
Fig. 12B
Fig. 12C
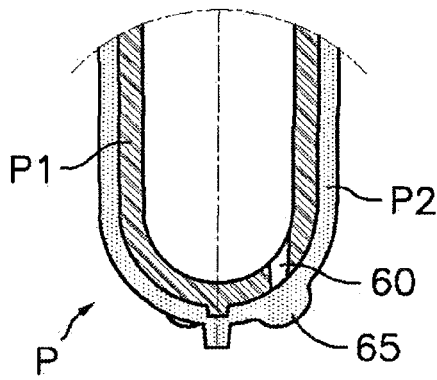
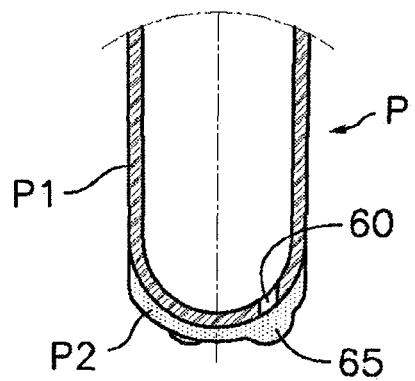
Fig. 13
Fig. 14

TWO-LAYERED PREFORM OBTAINED BY INJECTION OVERMOLDING

CROSS-REFERENCE TO RELATED APPLICATIONS

This application is a Divisional Application of U.S. patent application Ser. No. 12/575,711, filed Oct. 8, 2009 which is a Continuation-in-Part (CIP) Application of PCT International Application No. PCT/ES2008/000226, filed Apr. 11, 2008, which claims benefit of priority from PCT International Application No. PCT/ES2007/000202, filed Apr. 11, 2007. The contents of these applications are incorporated herein by reference.

TECHNICAL FIELD

The present invention relates to a two-layered preform obtained by injection overmolding and provided with an inner layer made of a material capable of providing a barrier effect against light by absorption and an outer layer made of a material capable of providing a barrier effect against light by reflection, with a neck of the two layered preform being made of the material of the outer layer alone. Such two-layered preform is applicable, for example, to the formation of bottles of milk by blow molding.

BACKGROUND OF THE INVENTION

The use of preforms for manufacturing bottles and other containers is well known. These preforms consist of tubular bodies of plastic material, with a mouth at a first end, a closed bottom at an opposite second end, and a neck adjacent to the mouth, which optionally includes an outer thread and a perimetric annular flange. The preforms are intended for the subsequent manufacture of plastic bottles by blowing the blind tubular part of the preform inside a mold without the neck and the mouth being altered. Two-layered preforms in which at least part of said tubular body is formed by two superimposed layers having different properties are increasingly used. These two-layered preforms are especially designed for packages requiring a layer with barrier property, for example, barrier against light or against certain gases such as $O_2$ and $CO_2$, packages in which an outer layer can be made of a recycled plastic material and an inner layer of a quality plastic material, or packages formed by two layers of plastic materials of a different color for aesthetic purposes.

Two-layered preforms can be manufactured by several techniques, among which injection overmolding is emphasized, which basically consists of first introducing a core in a primary molding cavity for molding a first layer of a primary molding material on the core, and then introducing said core, with said first layer arranged thereon, in an overmolding cavity for molding a second layer of an overmolding material on the first layer to produce the complete two-layered preform. The neck of the two-layered preform can be formed with the material of the first layer or with the material of the second layer by closing and opening a pair of neck half-molds arranged next to the mouth of the primary molding cavity or of the overmolding cavity, respectively. The molds for producing two-layered preforms in many injection overmolding apparatuses comprise multiple primary molding cavities, multiple overinjection cavities, multiple pairs of neck half-molds and multiple grouped cores which are operated together by the injection overmolding apparatus for large productions.

There are different types of injection overmolding apparatuses using different mechanisms and methods for performing the alternate introduction and extraction of the cores from the primary molding cavities and overinjection cavities, the closing and opening of the neck half-molds, the ejection of the finished two-layered preforms, etc. International patent application PCT/ES2006/000047, which is incorporated by reference, describes an example of an apparatus for manufacturing preforms by injection overmolding using multiple cores to be alternately introduced in multiple primary molding cavities and multiple overinjection cavities.

A common problem in the molds of any type of apparatus for manufacturing two-layered preforms by injection overmolding is that the cores, due to their slenderness and to their long cantilevered portion, can be slightly deformed elastically inside the primary molding cavities during the injection of the primary molding material of the first layer due to the differences in the temperature, and therefore in the fluidity, of the plastic material injected in an initial phase and in a final phase of the injection process, and to the random distribution of this material with different degrees of fluidity inside the empty space defined between the primary molding cavity and the core.

The injection nozzle is generally arranged in a closed bottom of the primary molding cavity facing a free end of the core. Thus, if the material injected in the initial phase, which is less hot, and therefore less fluid, due to the time it has been retained in the injection nozzle and adjacent conduit during the movements of position change of the cores, is randomly directed towards a side of the free end of the core, the hotter, and therefore more fluid material injected next and coming from the hot channel will flow more easily and quickly towards the opposite side of the core and towards the area of the mouth of the cavity. The less fluid material will exert a pressure on a first side of the core greater than the pressure exerted by the less fluid material on an opposite second side, and the core will experience a slight elastic deformation towards this second side.

Given that the thicknesses of the layers of the two-layered preform are subject to strict dimensional tolerances, a slight deformation of the core during the injection operation of the first layer results in variations in the thickness of both layers in opposite sides of the two-layered preform which may be unacceptable, taking into account that the thickness of the layers is reduced to significantly small values during the subsequent blow molding process to form the bottle or another container from the two-layered preform.

U.S. Pat. No. 3,301,928, which is incorporated by reference, proposes supporting the core inside the molding cavity by means of a supporting appendage extending from a valve body of an injection valve for injecting molding material arranged in the closed bottom of the cavity. The valve body is axially movable in alignment with the axis of the cavity and the core, and the mentioned supporting appendage has a conical head which is coupled in a conical recess formed at the end of the core whereas the valve is open to inject the molding material into the cavity. During a final phase of the molding operation of the preform, when a small portion of the cavity still has to be filled, the valve body is retracted to allow completely filling the cavity and to then close the passage of molding material into the cavity. However, this arrangement has several drawbacks. On one hand, the incorporation of the injection valve arranged in the closed bottom of the cavity involves a relatively complex construction and operation, and on the other hand, the fact that the core is no longer supported during the final phase of the molding operation does not ensure a perfect alignment of the core in the molding cavity during the entire injection process of the preform.

U.S. Pat. No. 4,086,315, which is incorporated by reference, discloses an apparatus for producing hollow plastic bodies by injection molding a preform on a core introduced in an injection molding cavity and subsequent blowing said preform inside a blow molding cavity. Supports projecting from an area of the closed bottom of the injection cavity make contact with the end of the core to coaxially support it during the entire injection molding operation. These supports leave holes in the preform. The injection molding cavity is furthermore configured to form a protrusion at the axial end of the preform. The core is extracted from the injection molding cavity and then introduced, with the recently formed and still hot preform thereon, in the blow molding cavity for the blow molding operation. In an area of the bottom of the blow molding cavity there is arranged a cylinder with an axially operated piston to press said protrusion of the preform against the end of the core for the purpose of extruding the material of said protrusion and thus close the holes existing in the preform before the blow molding. A drawback of this arrangement is that the incorporation of the cylinder and piston assembly at the end of the blow molding cavity is complex and expensive. Furthermore, if, as usual, the preforms are to be allowed to cool in order to remove them from the core and store them for a subsequent distribution and use in a plurality of blow molding apparatuses, this would limit the use of such preforms with holes to only those blow molding apparatuses which are equipped with the mentioned cylinder and piston assembly to extrude the protrusion and close the holes before the blow molding operation. Furthermore, the apparatus is intended to manufacture monolayer preforms and in the specification is not described nor suggested the way to use it to manufacture two-layered preforms.

International patent application WO 89/07219 A, which is incorporated by reference, describes a process for injection molding a thin-walled, hollow plastic product, wherein a first common mold part is combined with a first complementary mold part to assemble a first mold cavity. Portions of the first complementary mold part contact portions of the first common mold part to rigidly secure mold parts in a position which impedes movement of the mold parts in relation to each other during injection of a first plastic material into the first mold cavity. The first plastic material is shaped such that when it is contained in a second mold cavity, which is formed by combining the first common mold part with a second complementary mold part, it provides stabilizing regions that rigidly secure the mold parts in a position which impedes movement during injection of a second plastic material. However, there is not described nor suggested that the two-layered plastic product obtained by such process is useful to be subsequently blow molded, and in fact the alternate arrangement of monolayer regions of different materials in the hollow plastic product is a serious drawback since the joining areas therebetween are substantially parallel to the pressure direction during a blow molding operation and this involves a risk of said joining areas to be broken.

Patent EP 1 681 239 A1, which is incorporated by reference, describes a multilayer preform obtained by a sequential co-injection process and having inner and outer layers made of PET colored with titanium dioxide to reflect light and a layer made of PET colored with carbon black to absorb light arranged between said inner and outer layers. A drawback related with the sequential co-injection process in comparison with the overmolding process I that the former is not suitable for injecting only two layers forcing to inject an odd number thereof, in general three or five. It neither permits to accurately control the extent of the intermediate layer or layers nor the uniformity in the width of the layers. A lack of precision in the preform can result in irregularities in a container obtained by blow molding the preform, and such irregularities will be the more accentuated the more thinner are the layers of the preform.

WO 95/00325, which is incorporated by reference, discloses a multi-layer plastic preform for use in plastic blow molding including an injection molded inner layer of virgin plastic having an outwardly extending annular flange at an open end of the preform. An injection molded outer layer of post-consumer recycled plastic covers the inner layer and has a thread for securing a closure, and this thread is located toward the closed end of the preform from the annular flange of the inner layer to thereby provide a construction that allows increased use of the recycled plastic. The preform may be provided with an intermediate layer of a gas barrier material when the container to be blow-molded from the preform is to be used to hold gas pressurized liquids such as soft drinks. The need of the mentioned annular flange in the inner layer at an open end of the preform prevents the possibility of making the neck of the preform only with the material of the outer layer.

DISCLOSURE OF THE INVENTION

U.S. patent application Ser. No. 12/575,711, the parent of the present application, discloses and claims a mold for manufacturing two-layered preforms by plastic injection overmolding. The mold comprises a primary molding cavity connected to a first hot channel for supplying a primary molding material, an overmolding cavity connected to a second hot channel for supplying an overmolding material, and a core configured to first be introduced in said primary molding cavity for a molding operation of a first layer of said primary molding material, and to then be introduced, with said first layer arranged thereon, in said overmolding cavity for an overmolding operation of a second layer of said overmolding material. The mold includes at least one supporting member arranged between a free end of said core and the primary molding cavity to support the core in the primary molding cavity during the entire molding operation of the first layer. The mentioned supporting member is configured to form a corresponding opening in the first layer to be subsequently filled and/or covered by the overmolding material of the second layer.

With this construction, the supporting member, which is at least one in number, holds and stabilizes the core in a centered position inside the primary molding cavity and prevents the elastic deformation of the core during the injection operation of the first layer, whereby the thickness of the first layer is substantially uniform around the circumference thereof, according to accepted dimensional manufacturing tolerances. The fact that the first layer has a uniform thickness contributes to the second layer, subsequently obtained by injection overmolding in the overmolding cavity, also being substantially uniform. On the other hand, the problem of elastic deformation of the core during the overmolding operation of the second layer is generally less pronounced, and in many cases the second layer has a greater thickness than the first layer and/or has a less relevant function, for example, as a barrier material, whereby a small irregularity in the thickness of the second layer is less relevant than in the first layer.

In a first embodiment of the mold, the supporting member is fixed with respect to the primary molding cavity, whereas in a second embodiment of the mold, the supporting member is fixed with respect to the core. In any of the two embodiments of the mold, it is preferable that three or more of said supporting members are provided. Three supporting members angularly spaced at 120 degrees around a longitudinal central axis of the primary molding cavity and of the core are preferable, since they thus provide an isostatic support, and it is also preferable that the supporting members support the core close to the free end thereof.

Due to the fact that the supporting members are fixed, they are obviously present during the entire injection operation of the first layer and therefore they form openings in the material of the first layer which are filled and/or covered with the material of the second layer during the injection operation of the second layer by overmolding. When the supporting members project from the primary molding cavity, the openings in the first layer are empty when the core with the first layer is introduced in the overmolding cavity, and thus the overmolding material of the second layer fills and at the same time covers the openings of the first layer. When the supporting members project from the core, the openings in the first layer are occupied by the supporting members when the core with the first layer is introduced in the overmolding cavity, such that the overmolding material of the second layer simply covers the openings of the first layer without filling them. The overmolding cavity is preferably configured to form bulges in those regions of the second layer which cover the openings of the first layer.

The situation of the openings in the first layer filled and/or covered by the second layer close to the closed bottom of the two-layered preform determines that in the bottle or another container obtained by blow molding from the two-layered preform these openings are located in the base and very close to the center of the bottle or another container, which is a place generally not very exposed, and therefore not very critical. Furthermore, this final area of the preform is deformed relatively little during the blow molding process and the openings are stretched relatively little.

U.S. patent application Ser. No. 12/575,711 also discloses and claims a method for manufacturing two-layered preforms by plastic injection overmolding which comprises the steps of first introducing a core in a primary molding cavity connected to a first hot channel and supplying a primary molding material to perform a molding operation of a first layer, and then introducing said core, with said first layer arranged thereon, in an overmolding cavity connected to a second hot channel and supplying an overmolding material to perform an overmolding operation of a second layer. The method comprises supporting a free end of the core with respect to said primary molding cavity during the entire mentioned molding operation of the first layer by means of at least one supporting member and filling and/or covering a corresponding opening left by said supporting member in the first layer with the overmolding material of the second layer.

In a first embodiment of the method, the core is supported by means of one or more fixed supporting members projecting from an inner surface of the primary molding cavity to make contact with the core, and openings produced by the supporting members in the first layer are filled and covered with the overmolding material during the overmolding operation of the second layer. According to a second embodiment of the method, the core is supported by means of one or more fixed supporting members projecting from the core to make contact with an inner surface of the primary molding cavity, and openings produced by the supporting members in the first layer are simply covered with the overmolding material during the overmolding operation of the second layer. In this case, the method preferably comprises forming bulges in the regions of the second layer which cover the openings of the first layer by means of depressions formed in the inner surface of the overmolding cavity to provide the two-layered preform with a thickness in the regions in which the openings of the first layer are located equivalent to the thickness of the regions with a double layer.

The mold and/or the method of the first and second embodiments can be used in a machine provided with two injection units for injecting two different materials for the two layers of the two-layered preform or two-component preform. A drawback associated with the two-layered preforms of different components obtained by injection overmolding of some synthetic polymers, and especially of polyethylene terephthalate (PET) or polypropylene (PP), according to the prior art, is that the bottles and other containers obtained by blow molding such two-layered preforms show a tendency towards exfoliation or separation of the two layers forming them. This is due to the fact that a mixture of the synthetic polymer with one or more different coloring agents is used as molding material for each of the two layers, and in some cases the different nature of the coloring agents makes the adhesion between the two layers relatively weak even when the base polymer is the same. To prevent this drawback, the method comprises using a synthetic polymer as common base material for both layers, said synthetic polymer being mixed with one or more coloring agents in each layer, at least one of said coloring agents being common in the two layers.

In an embodiment, said synthetic polymer is polyethylene terephthalate (PET) or polypropylene (PP) and among the coloring agents which can be used there is titanium oxide ($TiO_2$) (white colorant) in solid or liquid form, and carbon black or carbon (black colorant) in solid, powder or liquid form. In a more specific embodiment, the method comprises using polyethylene terephthalate (PET) or polypropylene (PP) with from 0.01% to 2% by weight of carbon black or activated carbon and from 3% to 10% by weight of active ingredients of titanium oxide ($TiO_2$) as primary molding material of the first layer, or inner layer, and using polyethylene terephthalate (PET) or polypropylene (PP) with from 3% to 10% by weight of active ingredients of titanium oxide ($TiO_2$) as overmolding material of the second layer, or outer layer. This composition is suitable for manufacturing two-layered preforms intended for obtaining milk-containing bottles, in which the outer layer must provide a barrier effect against light by reflection and furthermore offer a final aesthetic appearance of the bottle in relation to its content, i.e., a white appearance which is as pure as possible, and in which the object of the inner layer is to provide a barrier effect against light by absorption.

The use of a percentage of titanium oxide ($TiO_2$) in both the inner and outer layers has the dual interest of favoring the adhesion of the two layers to one another and of mixing a proportion of white in the black colorant of the inner layer to cause a gray effect facilitating the optical coating by the outer layer and thus give a deep white appearance to the bottle obtained by blow molding the two-layered preform without this involving a significant decrease in the capacity of the inner layer to offer an efficient barrier against light by absorption. Nevertheless, it must be indicated that the present invention is not limited to the mentioned base materials and colorants, being it possible to use any other plastic materials which are suitable for manufacturing preforms and/or any other colorants.

Alternatively, the mold and/or the method can be applied to produce preforms with a very thin wall, for example with a thickness of 2.1 mm or less. To that end, most of the wall of the preform is of a single layer provided by the first layer, whereas the second layer is reduced to the region of the closed end of the preform just enough to fill and/or cover the openings produced in the first layer by the supporting members. In this case, the same plastic material, for example polyethylene terephthalate (PET) or polypropylene (PP), can be used for the first and second layers, such that the mold can be used with a standard injection machine, i.e., with a single injection unit. As a result of the fact of supporting the core in the primary molding cavity, the first layer in the single-layer regions can have a thickness which is sufficiently small, for example 2.1 mm or less, and uniform to assure a very thin and uniform wall in the product subsequently obtained by blow molding the preform.

The present invention provides a two-layered preform obtained by injection overmolding comprising a tubular body with a mouth providing a neck at a first end thereof and a closed bottom at an opposite second end, wherein at least part of said tubular body is formed by a first layer, which is an inner layer made of a primary molding material providing a barrier effect against light by absorption, and a second layer, which is an outer layer made of an overmolding material providing a barrier effect against light by reflection, and wherein said neck of the tubular body is formed with said overmolding material of the second layer alone, not coated by the primary molding material of the first layer.

In one embodiment, said primary molding material of the first layer is polyethylene terephthalate (PET) or polypropylene (PP) with from 0.01% to 2% by weight of carbon black or activated carbon and from 3% to 10% by weight of active ingredients of titanium oxide ($TiO_2$), and the overmolding material of the second layer (P2) is polyethylene terephthalate (PET) or polypropylene (PP) with from 3% to 10% by weight of active ingredients of titanium oxide ($TiO_2$).

Optionally, when the two layered preform of the present invention is obtained by the mold and/or the method disclosed in U.S. patent application Ser. No. 12/575,711, the first layer includes one or more openings in the region of said closed bottom of the tubular body, and the second layer covers completely the region of the closed bottom, with said one or more openings being filled or covered with the overmolding material of the second layer. Preferably, the first layer comprises three of said openings arranged at angular intervals of 120 degrees around the longitudinal central axis of the two-layered preform.

BRIEF DESCRIPTION OF THE DRAWINGS

The previous and other features and advantages will be more fully understood from the following detailed description of exemplary embodiments with reference to the attached drawings, in which:

FIG. 1 is a schematic cross-sectional depiction of several parts forming a mold for manufacturing two-layered preforms by injection overmolding in a position prior to the start of a molding injection operation according to a first embodiment of a method;

FIG. 1A is an enlarged detail of FIG. 1 to better show a closed bottom of the primary molding cavity;

FIG. 3 is a schematic cross-sectional depiction of the parts forming the mold of FIG. 1 in a position prior to an overmolding step of the method;

FIG. 3A is an enlarged detail of FIG. 3 to better show an end of the core with the first layer of the two-layered preform thereon;

FIG. 4 is a schematic cross-sectional depiction of the parts forming the mold of FIG. 1 in a position corresponding to the overmolding step of the method;

FIG. 4A is an enlarged detail of FIG. 4 to better show a closed bottom of the overmolding cavity with the core arranged therein and the first and second layers of the two-layered preform between both;

FIG. 11 is a sectioned partial view of another example of two-layered preform;

FIG. 12A is a partial view showing a free end of a core belonging to a mold according to a second embodiment;

FIG. 12B is a sectioned partial view showing the interaction of the core with the primary molding cavity in the mold of the second embodiment during a molding operation of the first layer of the preform according to a second embodiment of the method;

FIG. 12C is a sectioned partial view showing the interaction of the core with the overmolding cavity in the mold of the second embodiment during an overmolding operation of the second layer of the preform according to a second embodiment of a method;

FIG. 13 is a sectioned partial view of an example of two-layered preform according to a further embodiment of the present invention obtained with the mold and/or the method of the second embodiment; and FIG. 14 is a sectioned partial view of another example of two-layered preform obtained with the mold and/or the method of the second embodiment.

DETAILED DESCRIPTION OF EXEMPLARY EMBODIMENTS

Figure 2A:
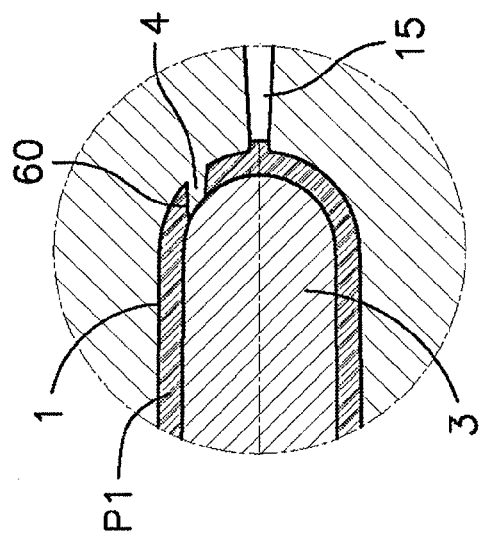
FIG. 2A is an enlarged detail of FIG. 2 to better show a closed bottom of the primary molding cavity with the core supported therein and the first layer of the two-layered preform between both.

Referring first to FIG. 1, there are shown the different parts forming a mold for manufacturing two-layered preforms by injection overmolding according to a first embodiment of a mold and/or a method. The mold comprises a primary molding cavity 1, which is connected to a first hot channel 10 for supplying a primary molding material into said primary molding cavity 1 through a first injection nozzle 15, and an overmolding cavity 2 connected to a second hot channel 20 for supplying an overmolding material into said overmolding cavity 2 through a second injection nozzle 25. In the embodiment shown, the primary molding cavity 1 and overmolding cavity 2 are stationary, although this is not essential. The mold further comprises a core 3 connected to a mobile plate 30 of an injection molding apparatus (not shown) operated to alternately introduce said core 3 into the primary molding cavity 1 and into the overmolding cavity 2. In the embodiment shown in FIG. 1, the mold is completed with a pair of neck half-molds 5a, 5b connected to respective mobile elements, which are in turn assembled on a mobile plate 50 of said injection molding apparatus (not shown), which is controlled to close and open the neck half-molds 5a, 5b next to the mouth of the overmolding cavity 2, in a well-known manner.

Figure 9:
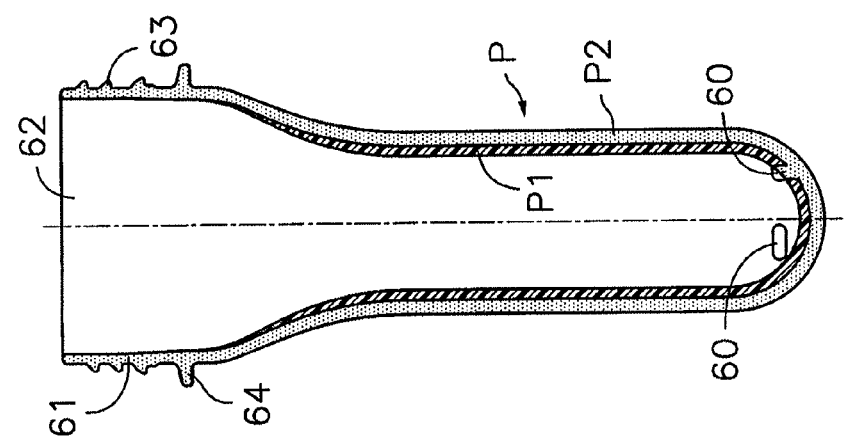
FIG. 9 is a sectioned view of a two-layered preform obtained by injection overmolding according to another embodiment of the present invention.
Figure 7:
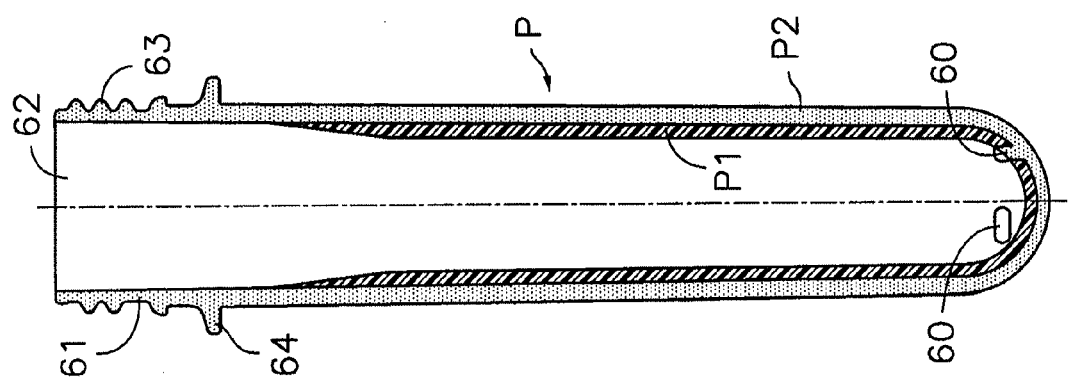
FIG. 7 is a sectioned view of a two-layered preform obtained by injection overmolding according to an embodiment of the present invention.

In the first embodiment shown in FIGS. 1 to 4, the core 3 has an outer surface configured to cooperate with an inner surface of the primary molding cavity 1 to form a first layer P1 of the two-layered preform P, the mentioned first layer P1 of the two-layered preform P has an outer surface which together with another outer surface of the core 3 cooperates with an inner surface of the overmolding cavity 2 to form a second layer P2 of the two-layered preform P, and the neck half-molds 5a, 5b are configured to form a neck 61 of said two-layered preform P together with the second layer P2 (see FIGS. 7 and 9). In an alternative embodiment (not shown), the neck half-molds 5a, 5b are arranged to be closed and opened by the injection molding apparatus next to the mouth of the primary molding cavity 1, such that the preforms obtained have the neck 61 formed together with the first layer P1 of the two-layered preform P (see FIGS. 8 and 10).

Figure 2:
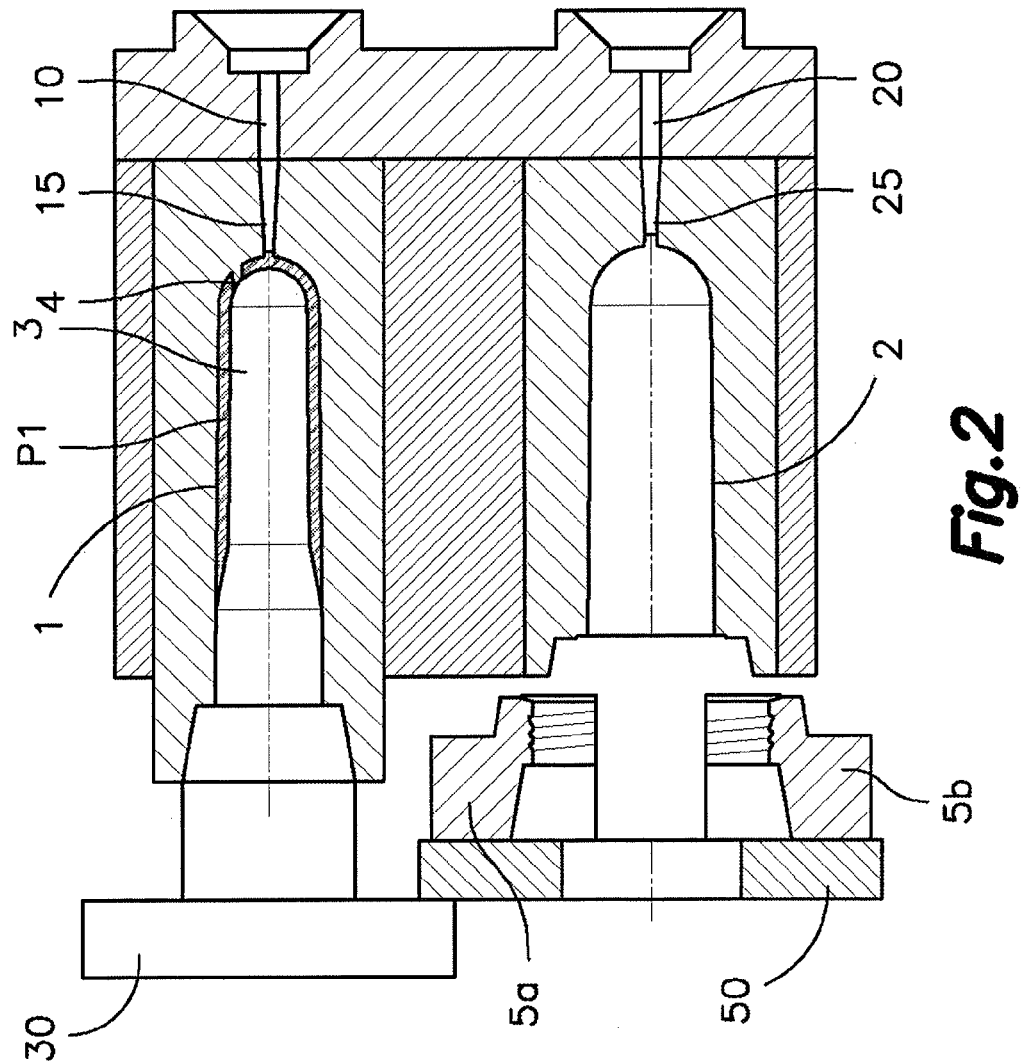
FIG. 2 is a schematic cross-sectional depiction of the parts forming the mold of FIG. 1 in a position corresponding to a primary molding step of the method.

The primary molding cavity 1 and overmolding cavity 2 generally have an elongated configuration with respect to a longitudinal axis and have a closed bottom opposite to their mouth. The first and second injection nozzles 15, 25 are opened in the center of the mentioned closed bottom of the respective primary molding cavity 1 and overmolding cavity 2. The core 3 generally has an elongated configuration with respect to a longitudinal axis and has a free end which is located adjacent to the closed bottom of each of the primary molding cavity 1 and overmolding cavity 2 when it is introduced therein. Three supporting members 4 (see also the enlarged detail of FIG. 1A) project from the inner surface of the primary molding cavity 1, said supporting members 4 being fixed with respect to the primary molding cavity 1 and arranged to make contact with the core 3 when the core 3 is introduced in the primary molding cavity 1 (FIG. 2). The supporting members 4 have a slightly conical configuration and are oriented in a direction parallel to the longitudinal axis of the primary molding cavity 1 to facilitate the extraction of the first layer P1 from the mold in a direction parallel to the direction of the movement of extraction of the core 3.

The arrangement of three supporting members spaced at angular intervals of 120 degrees around said first injection nozzle 15 in the closed bottom of the primary molding cavity 1 is preferred, since they thus provide an isostatic support for the core 3, close to the free end thereof, during a molding operation of the first layer P1 by means of the primary molding material. However, any number of fixed supporting members 4 arranged to support the core 3 inside the primary molding cavity 1 can be provided.

FIG. 2 shows a first step of the method using the mold of FIG. 1. This first step comprises first introducing the core 3 in the primary molding cavity 1 and supplying the primary molding material through the first hot channel 10 and the first injection nozzle 15 into the empty space defined between the primary molding cavity 1 and the core 3 to perform a molding operation of the first layer P1 of the two-layered preform P. In this step, the method comprises supporting the core 3 during the entire molding operation of the first layer P1 of the primary molding material by means of the supporting members 4 projecting from the inner surface of the primary molding cavity 1 to make contact with the core 3. Due to the fact that the core 3 is supported by the supporting members 4 during the molding operation of the first layer P1, the core 3 is not deformed and the first layer P1 has a uniform thickness around the perimeter of the two-layered preform P. The supporting members 4 which are in contact with the core 3 during the molding operation form corresponding openings 60 in the first layer P1 as is better seen in the enlarged detail of FIG. 2A.

FIG. 3 shows the core 3 once it has been extracted from the primary molding cavity 1 after molding the first layer P1, where the first layer P1 remains arranged on the core 3. The enlarged detail of FIG. 3A shows a cross-sectional view of one of the openings 60, which are empty when the core 3 is removed from the primary molding cavity 1. It can be observed in FIG. 3 that the core 3 has been aligned with the overmolding cavity 2 ready for the performance of the following step.

FIG. 4 shows the following step of the method, which comprises introducing the core 3, together with the first layer P1 arranged thereon, in the overmolding cavity 2 and supplying the overmolding material through the second hot channel 20 and the second injection nozzle 25 to perform an overmolding operation of a second layer P2, together with which the neck 61 of the two-layered preform P is formed by means of the closed neck half-molds 5a, 5b next to the mouth of the overmolding cavity 2. During this overmolding operation, the overmolding material fills and covers the openings 60 which had been formed by the supporting members 4 in the first layer P1 during the molding operation in the primary molding cavity 1. The enlarged detail of FIG. 4A shows a cross-sectional view of one of the openings 60 in the first layer P1 filled with the material of the second layer P2.

Finally, the core 3 is extracted from the overmolding cavity 2 with the two-layered preform P finished thereon, the two-layered preform P is ejected from the core 3 by a conventional ejection device (not shown) of the injection molding apparatus, and the bare core 3 is again aligned with the primary molding cavity 1 (FIG. 1) ready for starting a new cycle.

Figure 5:
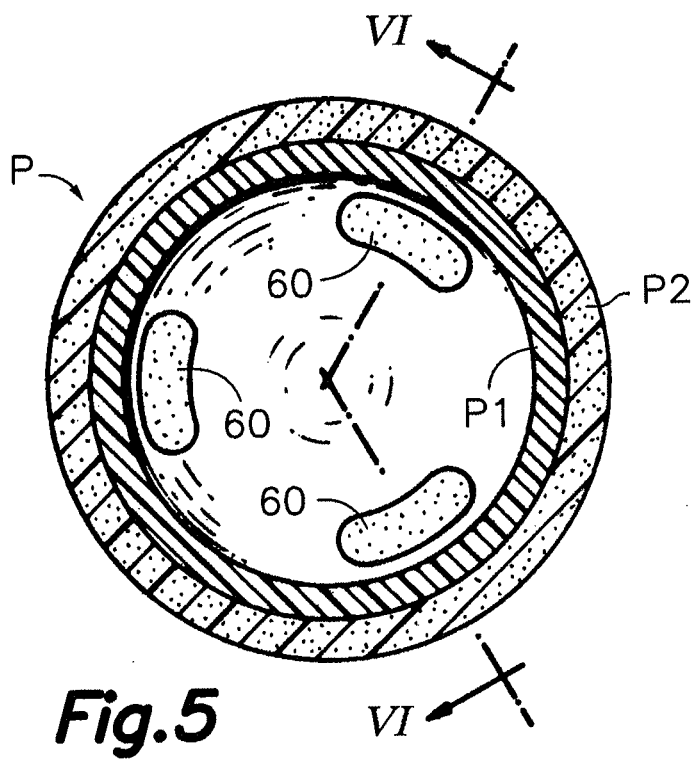
FIG. 5 is a cross-sectional view showing the inside of the closed bottom of a two-layered preform according to an embodiment of the present invention.
Figure 6:
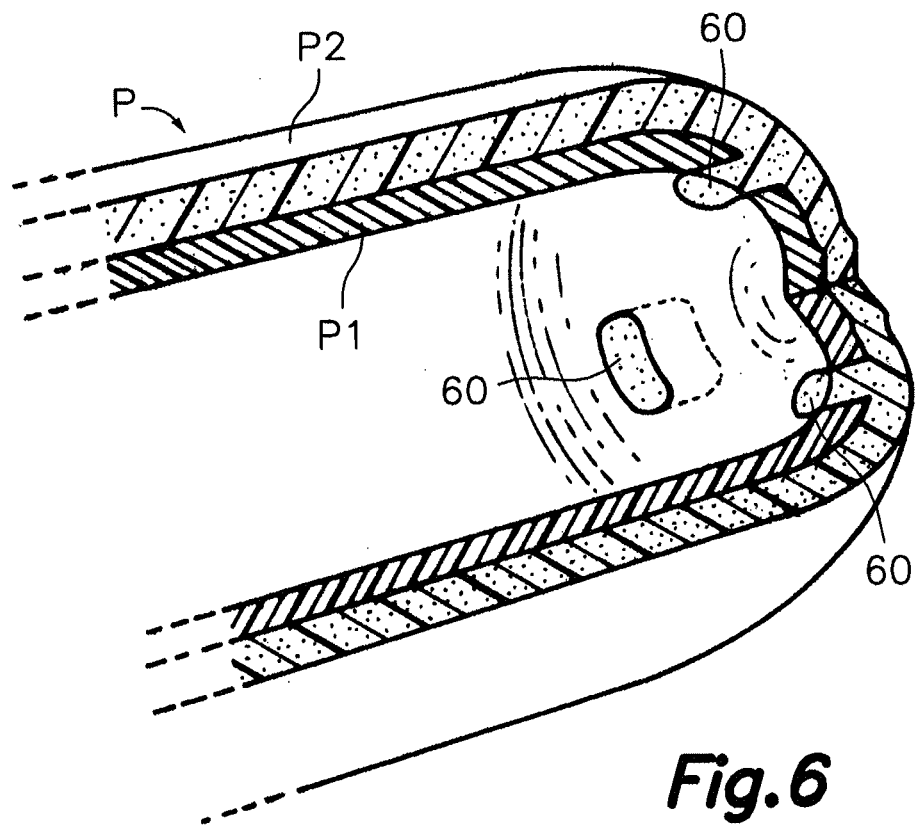
FIG. 6 is a perspective view sectioned through the planes indicated as VI-VI in FIG. 5.

FIGS. 5 and 6 show the closed bottom of a two-layered preform P according to an embodiment of the present invention obtained by means of the first embodiment of the mold and/or the method described above in relation to FIGS. 1 to 4. The two-layered preform P is comprised of a first layer P1 of a primary molding material and a second layer P2 of an overmolding material. The first layer P1 includes openings 60 filled with the material of the second layer P2. The openings 60 are a result of the presence of the supporting members 4 in contact with the core 3 during the molding operation of the first layer P1. Furthermore, as a result of the action of supporting the core 3 during the molding operation of the first layer P1, the thickness of both the first and second layers P1, P2 is substantially uniform around the perimeter of the two-layered preform P.

FIG. 7 depicts an embodiment of a two-layered preform P according to the present invention obtained by means of the mold and/or the method of the first embodiment, and especially designed for obtaining bottles for containing milk by means of a subsequent blow molding process. This two-layered preform P, as is usual, has the form of a tubular body with a mouth 62 at a first end and a closed bottom at an opposite second end. A part of said tubular body is formed by a first layer P1 of a primary molding material and a second layer P2 of an overmolding material. The first layer P1 of the two-layered preform P preferably has a thickness equal to or less than 1.8 mm and is sufficiently uniform to produce a very thin and uniform inner layer in a bottle subsequently obtained by blowing the two-layered preform P.

The mentioned primary molding material forming the first layer P1, which is the inner layer, is polyethylene terephthalate (PET) or polypropylene (PP) with from 0.01% to 2% by weight of carbon black or activated carbon and from 3% to 10% by weight of active ingredients of titanium oxide ($TiO_2$). The overmolding material forming the second layer, which is the outer layer, is likewise polyethylene terephthalate (PET) or polypropylene (PP) but only with from 3% to 10% by weight of active ingredients of titanium oxide ($TiO_2$). Thus, the first layer P1, or inner layer, has an opaque dark gray color and performs a function of barrier against light by absorption, whereas the second layer P2, or outer layer, has an opaque intense white color and performs a function of barrier against light by reflection. The fact that a proportion of one and the same coloring agent, such as titanium oxide ($TiO_2$), is present in the material of both layers P1, P2 favors a suitable adhesion of the two layers P1, P2 to one another and prevents exfoliation.

The first layer P1 comprises openings 60 filled with the material of the second layer P2. The mentioned openings are located in the closed bottom of the two-layered preform P, arranged at angular spaces of 120 degrees around the longitudinal central axis of the two-layered preform P and close to the center of said closed bottom. The openings 60 in the first layer P1 are a result of the presence of the supporting members 4 in contact with a core 3 in the primary molding cavity 1 of the mold in which the molding operation of said first layer P1 has been performed, and the fact that the first layer P1 has been molded with the core 3 being supported results in the thickness of said first and second layers P1, P2 being substantially uniform around the perimeter of the two-layered preform (P).

Furthermore, this two-layered preform P designed for obtaining bottles for containing milk has a neck 61 integrally formed with the overmolding material of the second layer P2, or outer layer. This neck 61 is formed around said mouth 62 and comprises an outer thread 63 for coupling a stopper and a perimetric annular flange 64 performing an auxiliary function in the handling and bottling lines. The neck 61 of the two-layered preform P has the final dimensions required for the bottle since it is unchanged during the blow molding process. The first layer P1 does not coat the inner surface of the mouth 62 in the neck 61, such that the inner surface of the neck 61 visible from the outside has the intense white color of the second layer P2. It must be emphasized that the substantially uniform thickness of the first and second layers P1, P2 as a result of the fact that the first layer P1 has been molded with the supported core 3 facilitates a precise demarcation of the extent of the first and second layers P1, P2 in the longitudinal direction of the two-layered preform P.

Figure 8:
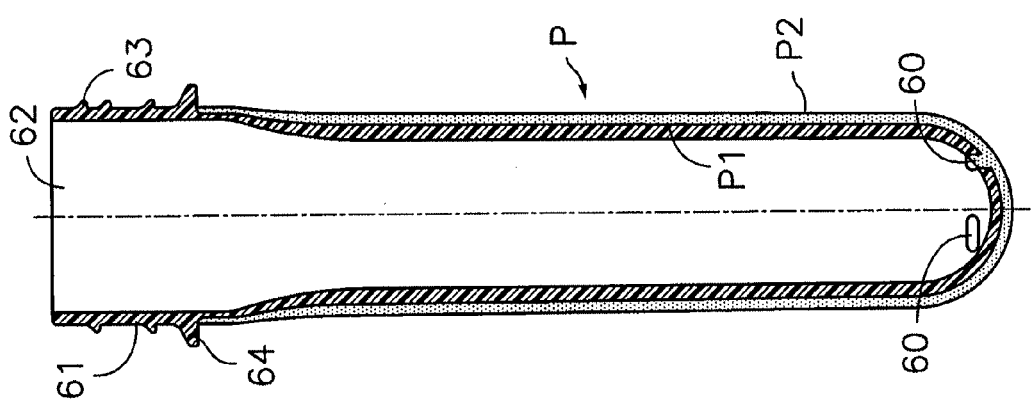
FIG. 8 is a sectioned view of a two-layered preform.

The two-layered preform P of FIG. 8, is, in relation to the shape, completely similar to the two-layered preform P shown in FIG. 7, except in that here the neck 61 is integrally formed with the primary molding material of the first layer P1, or inner layer. This two-layered preform P of FIG. 8 is obviously designed for obtaining bottles or other containers intended for other uses and as a result, the materials of the first and second layers P1, P2 are also different from those of the two-layered preform P of FIG. 7. For example, in the two-layered preform P of FIG. 8 the first layer P1, which is the inner layer in contact with the contained liquid, and which includes the neck 61, can be made of a quality polyethylene terephthalate (PET) or polypropylene (PP), whereas the second layer P2, which is the outer layer and will not be in contact with the contained liquid, can be made of a recycled polyethylene terephthalate (PET) or polypropylene (PP).

FIG. 9 shows a two-layered preform P according to the present invention similar to the one described above in relation to FIG. 7, although here the two-layered preform P is designed for obtaining wide-mouthed containers, for which the neck 21 and the mouth 62 are relatively wider. It is to be noted that a two-layered preform according to the present invention having a neck 61 formed with the overmolding material of the second layer P2 similar to that shown in FIGS. 7 and 9 and a simple closed bottom without openings 60 in the first layer P1 filled with the material of the second layer P2 can be obtained by any of the prior art injection overmolding apparatuses described above having the pairs of neck half-molds arranged next to the mouth of the overmolding cavities.

Figure 10:
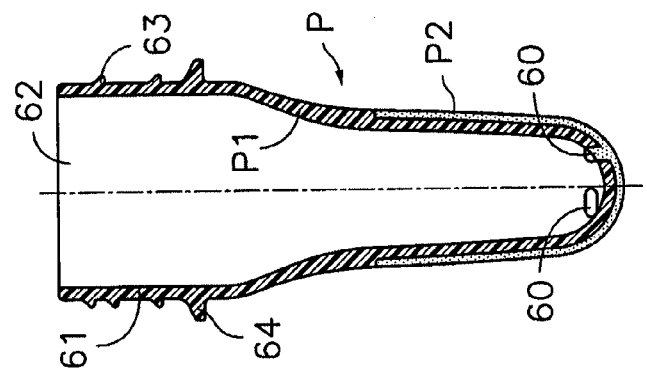
FIG. 10 is a sectioned view of a two-layered preform.

FIG. 10 shows a two-layered preform P, and which is similar to the one described above in relation to FIG. 8, with the difference of the second layer P2, which in this embodiment externally coats only the closed bottom and a portion, approximately half, of the tubular body of the two-layered preform P. An application of this two-layered preform P of FIG. 10 is, for example, for obtaining bottles of water or drinks with a visual effect of change or combination of colors. To that end, for example, the first layer P1 can be made of a transparent polyethylene terephthalate (PET), optionally containing a proportion of one or more transparent or translucent coloring agents, and the second layer P2 can be made of a polyethylene terephthalate (PET) containing a proportion of one or more transparent, translucent or opaque coloring agents. Furthermore, by playing with changes in the thicknesses of the first and second layers P1, P2 in combination with the areas of the two-layered preform P subjected to greater or lesser expansion during the blow molding operation, multiple visual effects of change and/or combination of colors, including color gradations can be achieved.

FIG. 11 shows the end corresponding to the closed bottom of a two-layered preform P having a thin wall made by means of the first embodiment of the mold and/or the method, in which the first layer P1 provides a single layer for most of the wall of the preform, optionally including a neck (not shown) at the open end. The second layer P2 is very small and only covers the region corresponding to the closed bottom of the first layer P1 filling the openings 60 left by the supporting members 4. Although FIG. 11 shows the second layer P2 covering the entire closed bottom with a thickness substantially equivalent to the thickness of the first layer P1, the overmolding cavity 2 could alternatively be configured to form the second layer P2 with a much smaller thickness and/or with a smaller configuration just enough to assure the flow of the molten overmolding material from the overmolding material injection nozzle 25 to the openings 60 of the first layer P1 in order to fill them during the overmolding operation. In the two-layered preform P of FIG. 11, the first and second layers P1, P2 can advantageously be made of the same material.

In relation to FIGS. 12A to 12C, a second embodiment of a mold and a method is described below. In this second embodiment, the supporting members 4 are fixed in the core 3, as shown in FIG. 12A, and project from the free end thereof to make contact with the inner surface of the primary molding cavity 1 (FIG. 12B). In the example shown, at the free end of the core 3 there are arranged three of said supporting members 4 to make contact with areas of the closed bottom of the primary molding cavity 1 around a primary molding material injection nozzle 15 located coaxially in the primary molding cavity 1.

When the core 3 is removed from the primary molding cavity 1 carrying the first layer P1, the openings 60 formed by the supporting members 4 are occupied by the supporting members 4. Thus, when the core 3 with the first layer P1 is then introduced in the overmolding cavity 2 (FIG. 12C) and the overmolding material is injected through the overmolding material injection nozzle 25 to form the second layer P2, the latter will simply cover the openings 60 of the first layer P1 without filling them. Preferably, in the closed bottom of the overmolding cavity 2 there are formed depressions 6 arranged around the overmolding material injection nozzle 25 in positions facing the supporting members 4 of the core 3 and openings 60 of the first layer P1. These depressions 6 are configured to form bulges 65 in those regions of the second layer P2 which cover the mentioned openings 60 of the first layer P1 of the two-layered preform P.

Thus, when the two-layered preform P is ejected from the core 3 (FIG. 13) the openings 60 of the first layer P1 are empty but covered by the bulges 65 of the second layer P2, such that the thickness of the wall of the two-layered preform P facing the openings 60 is substantially equivalent to the thickness of the wall in the regions provided with a double layer, which provides a substantially uniformity in the stretching of the materials of the first and second layers P1, P2 during a subsequent blow molding operation of the two-layered preform P.

The closed bottom of the two-layered preform P shown in FIG. 13 is compatible with a neck 61 formed with the overmolding material of the second layer P2 alone as shown in FIGS. 7 and 9 to obtain a two-layered preform according to the present invention.

FIG. 14 shows another example of two-layered preform P which can be produced by means of the second embodiment of the mold and/or the method. The two-layered preform P of FIG. 14 is a preform with a very thin wall, for example of less than 2.1 mm. The first layer P1 provides a single layer for most of the wall of the preform, optionally including a neck (not shown) at the open end. This first layer P1 has a thickness equal to or less than 2.1 mm. The second layer P2 is very small and only covers the region corresponding to the closed bottom of the first layer P1, with the bulges 65 of the second layer P2 covering but not filling the openings 60 left by the supporting members 4. It must be indicated that it is not necessary for the second layer P2 to cover all the closed bottom of the preform with a thickness substantially equivalent to the thickness of the first layer P1. The overmolding cavity 2 can alternatively be configured to form the second layer P2 with a much smaller thickness and/or with a smaller configuration just enough to assure the flow of the molten overmolding material from the overmolding material injection nozzle 25 to the bulges 65 of the second layer P2 in order to fill them during the overmolding operation. In the two-layered preform P of FIG. 14, the first and second layers P1, P2 can advantageously be made of the same material.

A person skilled in the art will be able to carry out modifications and variations to the embodiments shown and described without departing from the scope of the present invention as it is defined in the attached claims.

The invention claimed:

1. A two-layered preform obtained by injection overmolding, comprising a tubular body with a neck providing a mouth at a first end thereof and a closed bottom at an opposite second end, at least part of said tubular body being formed by a first layer made of a primary molding material and a second layer made of an overmolding material, wherein:
said first layer is an inner layer providing a barrier effect against light by absorption;
said second layer is an outer layer providing a barrier effect against light by reflection;
both said primary molding material of the first layer and said overmolding material of the second layer comprise a synthetic polymer mixed with one or more coloring agents;
said synthetic polymer and at least one of said coloring agents are common to both the primary molding material of the first layer and the overmolding material of the second layer;
another of said coloring agents is only present in the primary molding material of the first layer; and
said neck is formed with said overmolding material of the second layer not coated by the primary molding material of the first layer.

2. The preform according to claim 1, wherein the synthetic polymer common to the primary molding material of the first layer and the overmolding material of the second layer is polyethylene terephthalate or polypropylene.

3. The preform according to claim 2, wherein the primary molding material of the first layer comprises polyethylene terephthalate or polypropylene with from 0.01% to 2% by weight of carbon black or activated carbon and from 3% to 10% by weight of active ingredients of titanium oxide; and the overmolding material of the second layer comprises polyethylene terephthalate or polypropylene with from 3% to 10% by weight of active ingredients of titanium oxide.

4. The preform according to claim 2, wherein the first layer includes at least one opening in the region of said closed bottom of the tubular body, and said second layer covers completely the region of the closed bottom, with said at least one opening being filled or covered with the overmolding material of the second layer.

5. The preform according to claim 1, wherein said coloring agent common to both the primary molding material of the first layer and the overmolding material of the second layer is titanium oxide.

6. The preform according to claim 5, wherein the primary molding material of the first layer comprises polyethylene terephthalate or polypropylene with from 0.01% to 2% by weight of carbon black or activated carbon and from 3% to 10% by weight of active ingredients of titanium oxide; and the overmolding material of the second layer comprises polyethylene terephthalate or polypropylene with from 3% to 10% by weight of active ingredients of titanium oxide.

7. The preform according to claim 5, wherein the first layer includes at least one opening in the region of said closed bottom of the tubular body, and said second layer covers completely the region of the closed bottom, with said at least one opening being filled or covered with the overmolding material of the second layer.

8. The preform according to claim 1, wherein said coloring agent which is only present in the primary molding material of the first layer is carbon black or activated carbon.

9. The preform according to claim 8, wherein the primary molding material of the first layer comprises polyethylene terephthalate or polypropylene with from 0.01% to 2% by weight of carbon black or activated carbon and from 3% to 10% by weight of active ingredients of titanium oxide; and the overmolding material of the second layer comprises polyethylene terephthalate or polypropylene with from 3% to 10% by weight of active ingredients of titanium oxide.

10. The preform according to claim 8, wherein the first layer includes at least one opening in the region of said closed bottom of the tubular body, and said second layer covers completely the region of the closed bottom, with said at least one opening being filled or covered with the overmolding material of the second layer.

11. The preform according to claim 1, wherein the primary molding material of the first layer comprises polyethylene terephthalate or polypropylene with from 0.01% to 2% by weight of carbon black or activated carbon and from 3% to 10% by weight of active ingredients of titanium oxide; and the overmolding material of the second layer comprises polyethylene terephthalate or polypropylene with from 3% to 10% by weight of active ingredients of titanium oxide.

12. The preform according to claim 11, wherein the first layer includes at least one opening in the region of said closed bottom of the tubular body, and said second layer covers completely the region of the closed bottom, with said at least one opening being filled or covered with the overmolding material of the second layer.

13. The preform according to claim 1, wherein the first layer includes at least one opening in the region of said closed bottom of the tubular body, and said second layer covers completely the region of the closed bottom, with said at least one opening being filled or covered with the overmolding material of the second layer.

14. The preform according to claim 13, wherein the first layer comprises three of said openings filled or covered with the overmolding material of the second layer arranged at angular intervals of 120 degrees around a longitudinal central axis of the tubular body.

* * * * *